United States Patent
Minase

[19]

[11] Patent Number: 6,111,826
[45] Date of Patent: Aug. 29, 2000

[54] OPTICAL DISK DRIVE CAPABLE OF CONTROLLING THE ROTATION SPEED OF THE DISK BASED ON DETECTING THE VIBRATION

[75] Inventor: Minoru Minase, Iruma, Japan

[73] Assignee: Teac Corporation, Tokyo, Japan

[21] Appl. No.: 09/226,686

[22] Filed: Jan. 7, 1999

[30] Foreign Application Priority Data

Jan. 12, 1998 [JP] Japan ................................. 10-004003

[51] Int. Cl.[7] .................................................. G11B 17/22
[52] U.S. Cl. ................................ 369/33; 369/50; 369/267
[58] Field of Search .............................. 369/50, 33, 267, 369/32, 47, 48

[56] References Cited

U.S. PATENT DOCUMENTS 5,477,522  12/1995  Kim ........................................ 369/267
5,835,463  11/1998  Teshirogi et al. ...................... 369/50
5,862,113   1/1999  Tsuyuguchi et al. ................... 369/50
5,963,517  10/1999  Nakagaki et al. ...................... 369/47

FOREIGN PATENT DOCUMENTS 5-198078   8/1993  Japan .
11-25586   1/1999  Japan .
11-73719   3/1999  Japan .

*Primary Examiner*—Tan Dinh
*Attorney, Agent, or Firm*—Anderson, Kill & Olick P.C.

[57] ABSTRACT

An optical disk drive driving an optical disk includes a vibration detecting part for detecting a vibration due to rotation of the optical disk, an operation part for calculating a rotational speed of the optical disk at which the vibration detected by the vibration detecting part is equal to or close to a given threshold value which is a critical point for tolerable vibration, and a control part for controlling the optical disk to be rotated at the rotational speed calculated by the operation part.

8 Claims, 7 Drawing Sheets

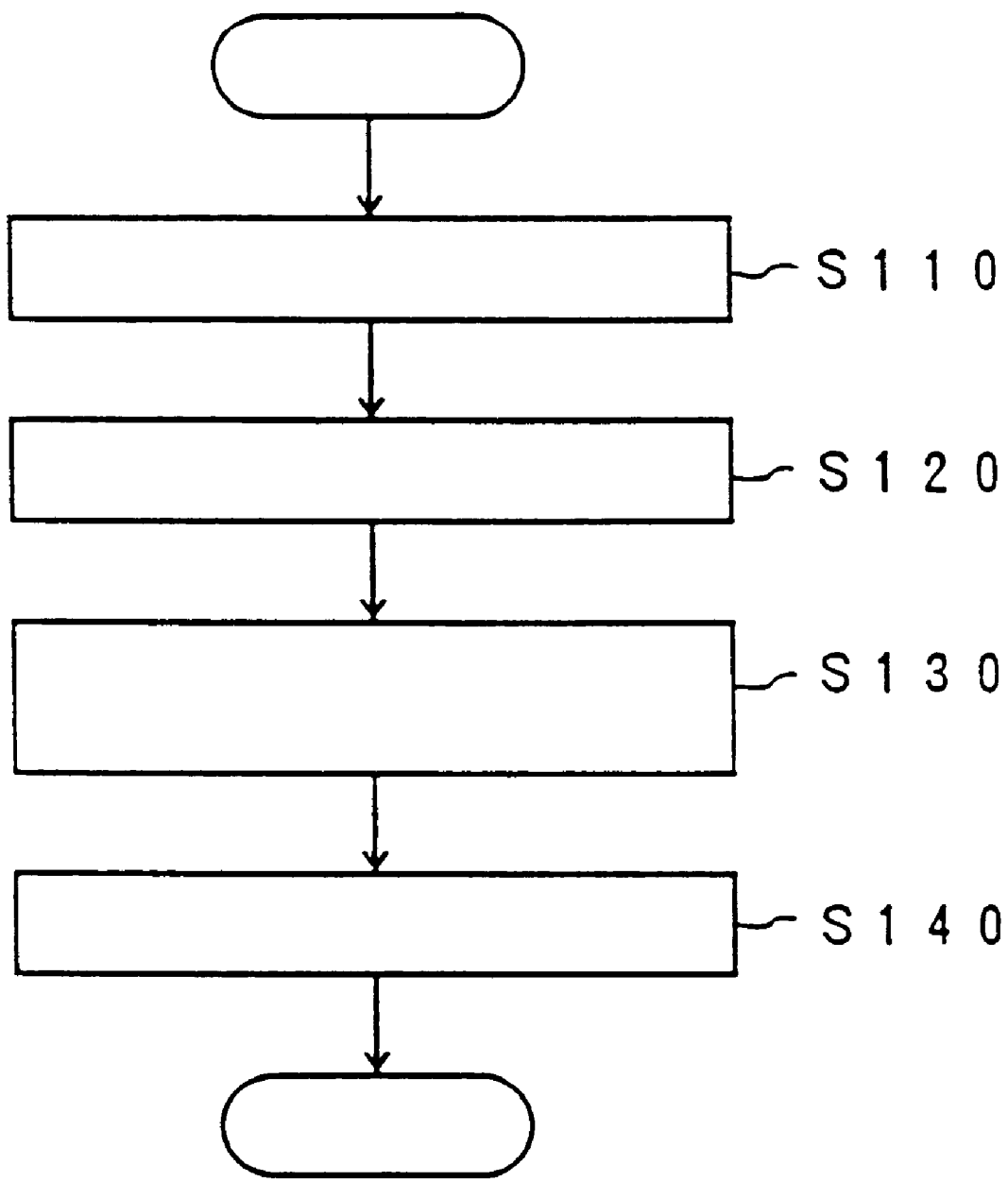

OPTICAL DISK DRIVE CAPABLE OF CONTROLLING THE ROTATION SPEED OF THE DISK BASED ON DETECTING THE VIBRATION

BACKGROUND OF THE INVENTION

1. Field of the Invention

The present invention generally relates to optical disk drives, and more particularly to an optical disk drive which reproduces information from an optical disk.

2. Description of the Related Art

An optical disk drive which reproduces information an optical disk such as a CD-ROM (Compact Disk Read Only Memory) is required to rotate the optical disk at a high speed in order to increase the data reproduction speed. However, when the rotational speed of the disk is as high as a 24-times speed (the normal rotational speed is defined as 1-time speed), vibration in the optical disk due to the eccentricity and unbalance (eccentric center of gravity) of the optical disk is increased in proportion to the power of the angular speed. The above vibration affects focus servo and tracking servo, and thus data may not be read from the disk.

It is possible to improve the anti-vibration performance by increasing the tracking servo gain. However, the vibration of the optical disk drive is propagated through a casing of the optical disk drive, and is transferred to a personal computer equipped with the optical disk drive. Hence, the body of the personal computer is vibrated. Further, mechanical noise may be caused. These problems make the user uncomfortable.

A device shown in FIG. 1 is proposed taking into account the above. The disk shown in FIG. 1 includes a main board 6, on which a spindle motor 2 for rotating an optical disk, an optical pickup unit 4 and electronic components are mounted. A shock sensor 8 is attached to the main board 6, and senses a vibration caused therein. Hence, the rotational speed of the spindle motor 2 is controlled.

As shown in FIG. 2, a vibration sense signal output by the shock sensor 8 passes through an equivalent circuit 10, which outputs a signal component within a given frequency range. The signal component thus extracted is compared with a threshold voltage by a comparator 12. When the signal component exceeds the threshold voltage, the comparator 12 outputs a high-level signal, which is supplied to a microcomputer 14. In response to receipt of the high-level signal from the comparator 12, the microcomputer 14 supplies a control signal to a spindle motor driver so that the rotational speed of the spindle motor 2 is decreased. Hence, the vibration of the optical disk 1 can be reduced.

However, the comparing operation using the threshold voltage in the comparator 12 enables only the selective control as to whether the rotational speed of the optical disk should be reduced. Further, the rotational speed of the optical disk may excessively be reduced or may insufficiently be reduced. Hence, data cannot be read rapidly and/or correctly.

Further, the critical vibration which reduces the rotational speed of the optical disk depends on users' demands, and depends on how the optical disk drive is attached to the casing of the personal computer. Hence, the single threshold voltage applied to the comparator 12 does not follow changes of the critical vibration due to the users' demands and attachment.

SUMMARY OF THE INVENTION

It is a general object of the present invention to provide an optical disk drive in which the above disadvantages are eliminated.

A more specific object of the present invention is to provide an optical disk drive capable of rotating an optical disk at a maximum speed or a speed closed thereto at which the magnitude of vibration is suppressed to a maximum tolerance level.

The above objects of the present invention are achieved by an optical disk drive driving an optical disk, comprising: vibration detecting means for detecting a vibration due to rotation of the optical disk; operation means for calculating a rotational speed of the optical disk at which the vibration detected by the vibration detecting means is equal to or close to a given threshold value which is a critical point for tolerable vibration; and control means for controlling the optical disk to be rotated at the rotational speed calculated by the operation means.

The optical disk drive may further comprise memory means for storing a map which describes a plurality of relationships between the rotational speed and the vibration level, wherein the operation means calculates the rotational speed by referring to the map stored in the memory means.

The optical disk drive may be configured so that the operation means detects which one of the plurality of the relationships stored in the map corresponds to the optical disk by using the vibration detected by the vibration detecting means.

The optical disk drive may be configured so that the operation means calculates the rotational speed which corresponds to the given threshold value related to said one of the plurality of relationships.

The optical disk drive may be configured so that the given threshold value corresponds to a demand by a user.

The optical disk drive may be configured so that the operation means detects which one of the plurality of the relationships stored in the map corresponds to the optical disk by referring to using the vibration detected by the vibration detecting means obtained when the optical disk is rotated at a given rotational speed.

The optical disk drive may be configured so that the memory means is a non-volatile memory.

The optical disk drive may be configured so that the operation means detects which one of the plurality of the relationships stored in the map corresponds to the optical disk by using the vibration detected by the vibration detecting means obtained when the rotational speed of the optical disk is gradually increased from a given minimum level.

BRIEF DESCRIPTION OF THE DRAWINGS

Other objects, features and advantages of the present invention will become more apparent from the following detailed description when read in conjunction with the accompanying drawings, in which:

FIG. 7 is a flowchart of a rotational speed control process executed by a microcomputer shown in FIG. 6.

DESCRIPTION OF THE PREFFERRED EMBODIMENTS

Figure 1:
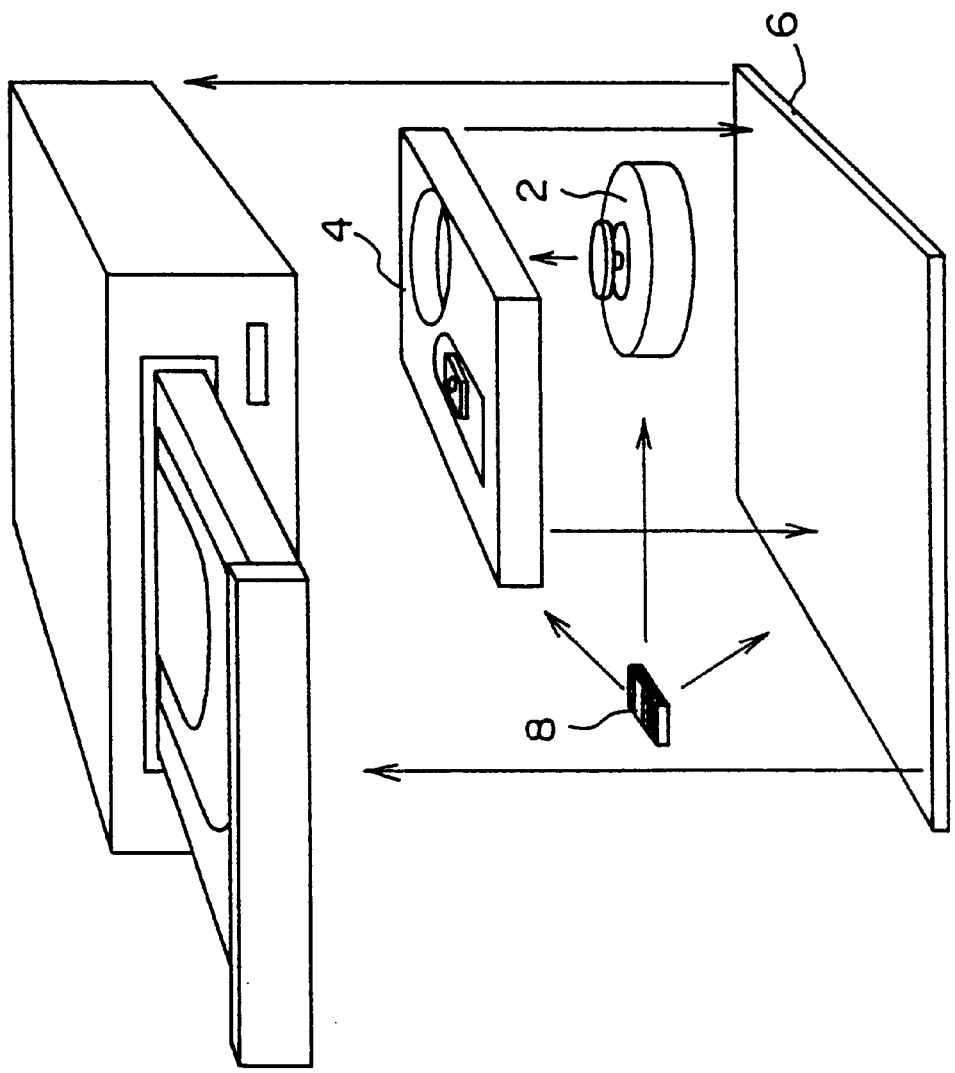
FIG. 1 is a diagram of a conventional optical disk drive.
Figure 2:
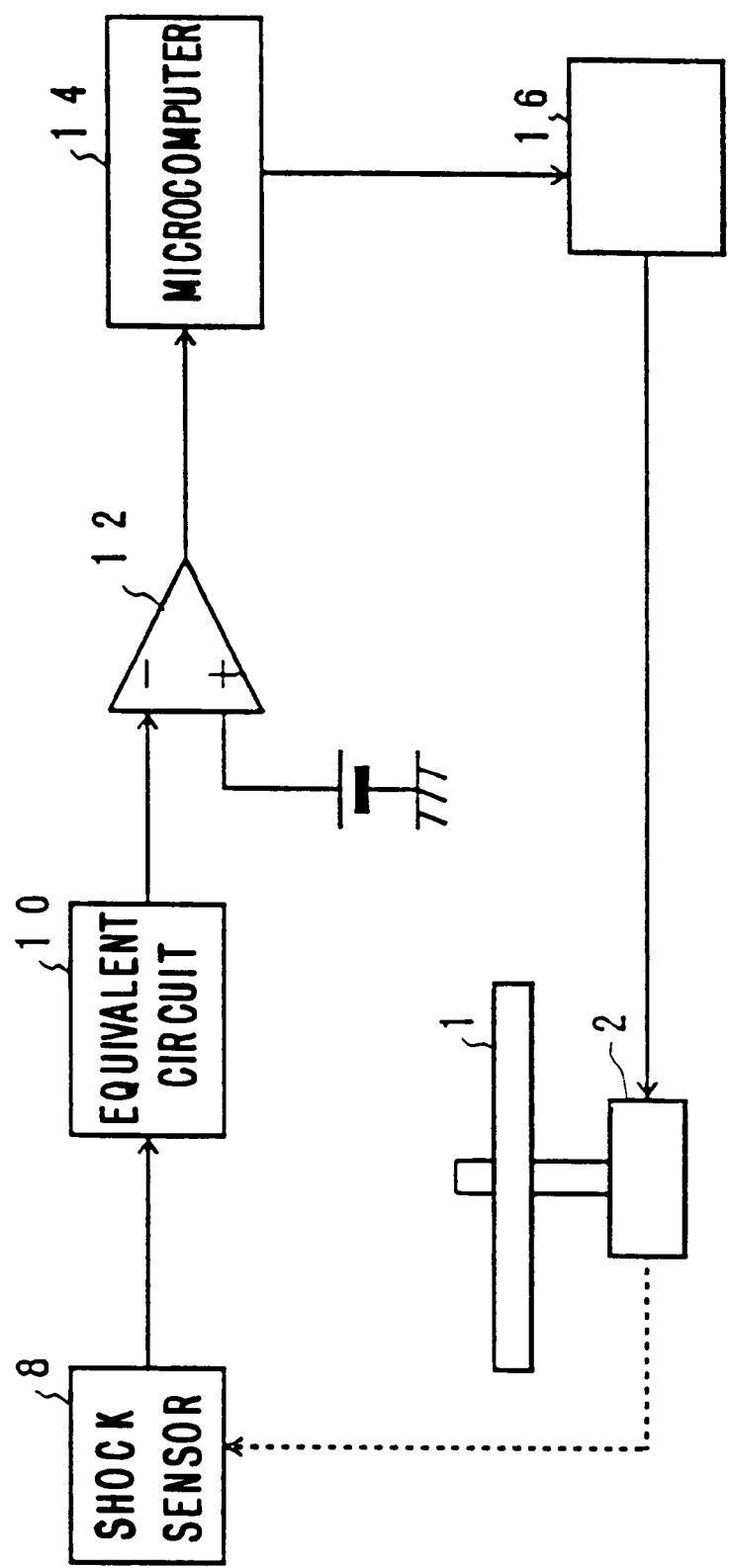
FIG. 2 is a block diagram of a control system of the conventional optical disk drive.
Figure 3:
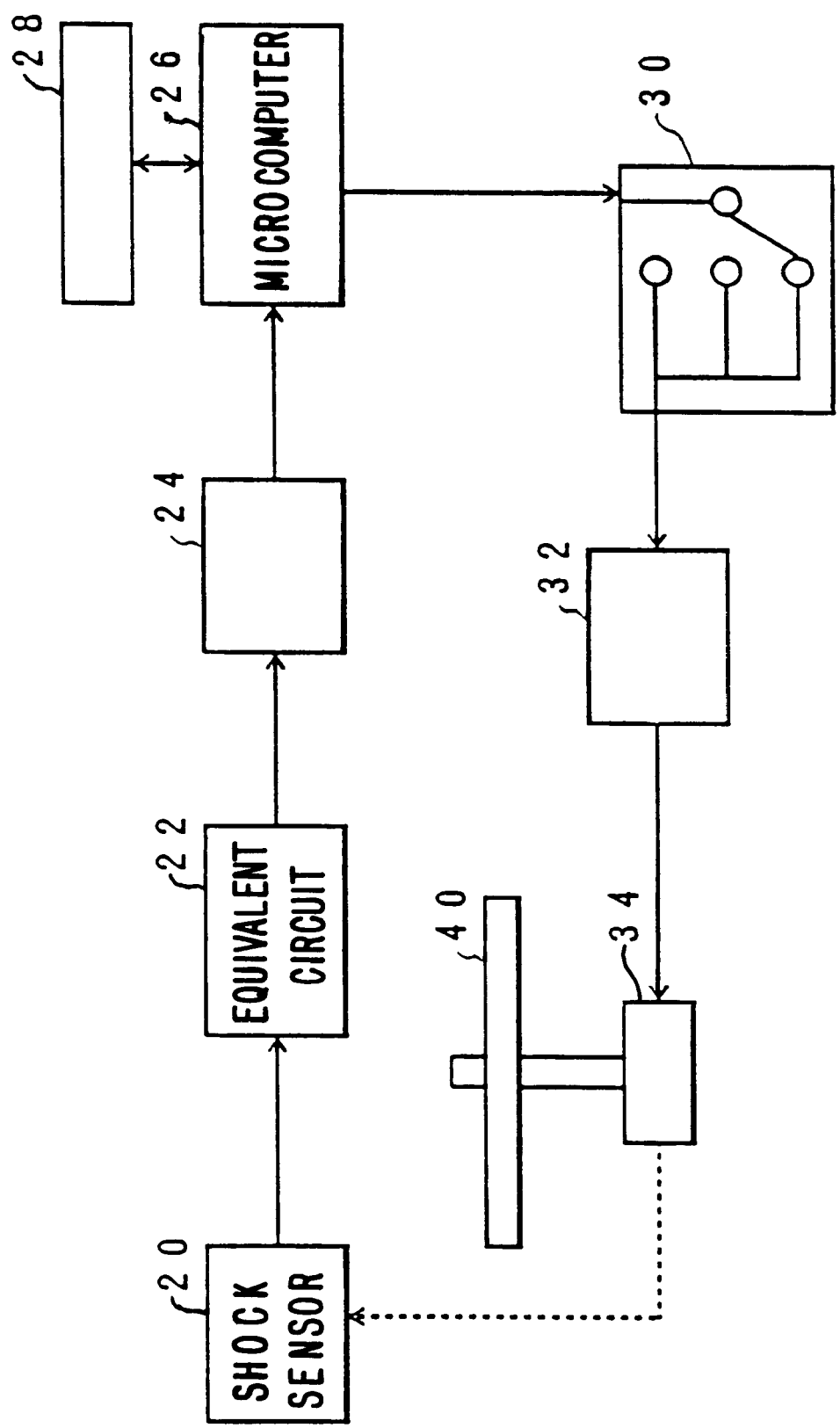
FIG. 3 is a block diagram of an optical disk drive according to a first embodiment of the present invention.

FIG. 3 is a block diagram of an optical disk drive according to a first embodiment of the present invention. A shock sensor 20 is arranged to a main board on which a spindle motor, an optical pickup unit and electronic devices are mounted. The shock sensor 20 includes, for example, a bimorph element formed by two pieces of piezoelectric ceramic. When a shock such as a vibration is applied to the shock sensor 20, the bimorph element is vibrated and thus a voltage is generated.

The vibration detecting signal output by the shock sensor 20 is supplied to an equivalent circuit 22, which amplifies only a signal component in a given frequency band. The amplified signal component is supplied to an A/D converter 24, and is digitized therein. The digitized vibration detection signal limited to the given frequency band is supplied to a microcomputer 26.

A non-volatile memory such as an EEPROM 28 is connected to the microcomputer 26. In accordance with the vibration detecting data supplied from the A/D converter 24 controls a switch 30 so that an appropriate one of speed control signals is supplied to a spindle motor driver 32. The speed control signals correspond to the reproduction speeds of an optical disk 40, such as a 2-times speed, 4-times speed and 16-times speed. The spindle motor driver 32 drives a spindle motor 34 in accordance with the speed control signal supplied thereto. Hence, the optical disk 40 is rotated at the specified speed.

Figure 4:
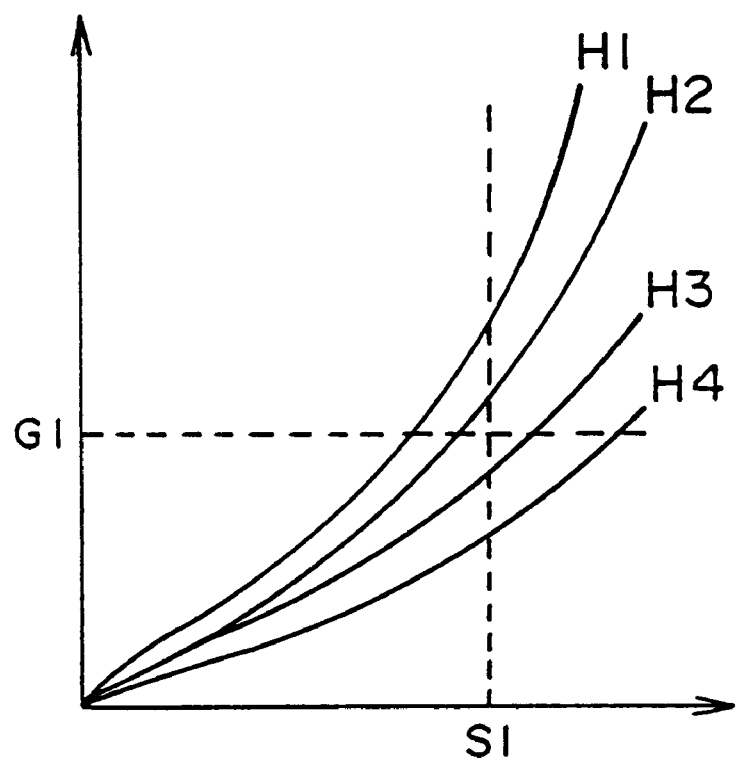
FIG. 4 is a graph of relationships between the vibration level and rotational speed with regard to various optical disks.

The EEPROM 28 stores a given threshold value G1, which corresponds to a vibration level and is registered at the time of production. The given threshold value is a critical point for tolerable vibration. Further the EEPROM 28 stores a map as shown in FIG. 4. The map describes relationships between the rotational speed and vibration level with regard to optical disks having different eccentricities. In FIG. 4, the degree of eccentricities is increased in the order of characteristics H1, H2, H3 and H4.

Figure 5:
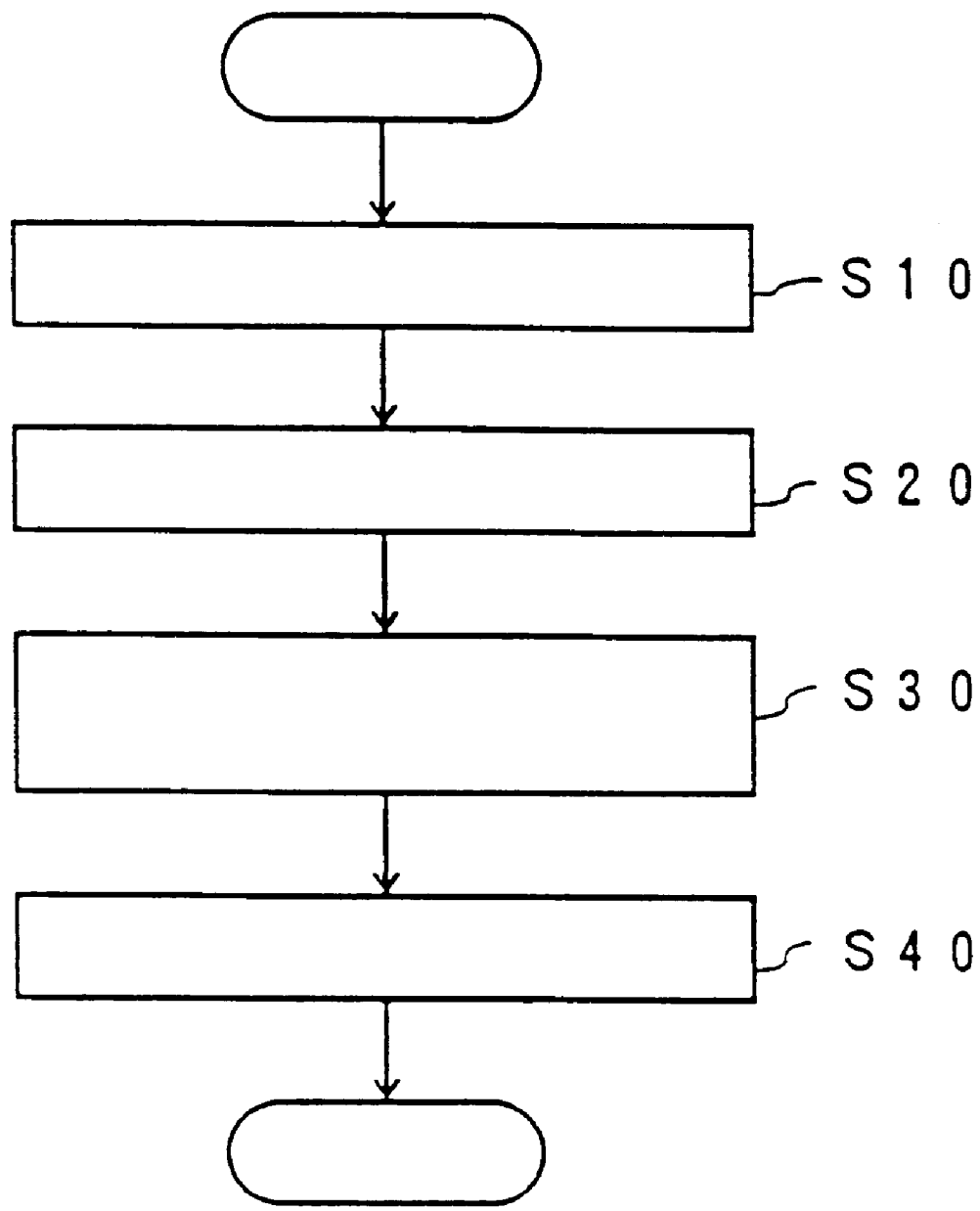
FIG. 5 is a flowchart of a rotational speed control process executed by a microcomputer shown in FIG. 3.

FIG. 5 is a flowchart of a rotational speed control process executed by the microcomputer 26 shown in FIG. 5. The process shown in FIG. 5 is executed at the time of starting to drive the optical disk drive. At step S10, the microcomputer 26 controls the switch 30 so that the speed control signal is supplied to the spindle motor driver 32 that rotates the optical disk 40 at a given rotational speed S1.

At step S20, the microcomputer 26 reads vibration detecting data G from the A/D converter 24, and determines which one of the characteristics H1–H4 corresponds to the vibration detecting data G by using the map shown in FIG. 4. At step S30, with regard to the optical disk of interest, the microcomputer 26 computes, by using the map shown in FIG. 4, the speed at which the vibration detecting data G becomes equal to or just below the threshold value G1 of the vibration level. For example, if the optical disk of interest has the characteristic H1, the speed corresponding to the vibration level G1 is lower than the given speed S1. If the optical disk of interest has the characteristic H4, the speed corresponding to the vibration level G1 is higher than the given speed S1.

At step S40, the microcomputer 26 controls the switch 30 so that the speed control signal corresponding to the calculated rotational speed is supplied to the spindle motor driver 32, and ends the process shown in FIG. 5.

As described above, it is possible to determine what rotational speed the optical disk 40 in progress of reproduction can be rotated at in the state in which vibration is less than the threshold value G1 by using the map shown in FIG. 4. Thus, the optical disk 40 can be rotated at the optimal or maximum rotational speed. Since the threshold value G1 as to the vibration level is registered in the EEPROM 28 at the time of production, the threshold value G1 can be set based on the users' demands. For example, if the user wishes to have low vibration and correct data readout rather than high-speed data readout, the threshold value G1 is set to a comparatively low level. If the user wishes to have high-speed data readout rather than low vibration, the threshold value G1 is set to a comparatively high level.

The speed obtained at step S30 is the maximum speed at which the vibration level is approximately equal to but lower than the threshold value G1 of vibration. The speed obtained at step S30 may be close to (lower than) the maximum speed which corresponding to the threshold value G1 of vibration.

Figure 6:
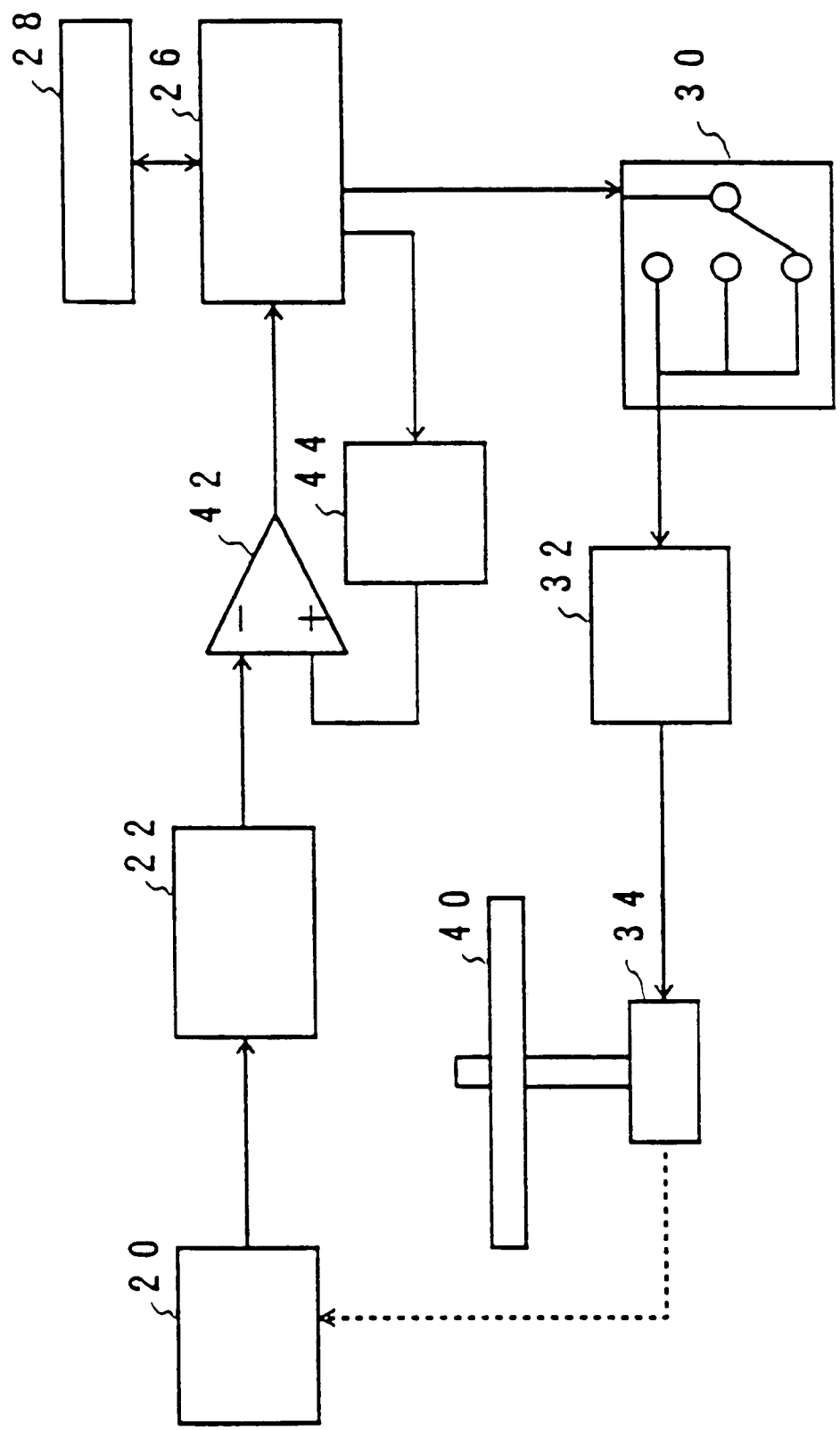
FIG. 6 is a block diagram of an optical disk drive according to a second embodiment of the present invention.

FIG. 6 is a block diagram of an optical disk drive according to a second embodiment of the present invention. In FIG. 6, parts that are the same as those shown in FIG. 3 are given the same reference numbers. The shock sensor 20 is attached to the main board on which the spindle motor, the optical pickup unit and electronic components. The shock sensor 20 includes a bimorph element formed by two pieces of piezoelectric ceramic. When a shock such as a vibration is applied to the shock sensor 20, the bimorph element is vibrated and thus a voltage is generated.

The vibration detecting signal output by the shock sensor 20 is supplied to the equivalent circuit 22, which amplifies only a signal component in a given frequency band. The amplified signal component is supplied to a comparator 42, which is supplied with a threshold value from the microcomputer 26 via a D/A converter 44. The comparator 42 outputs a high-level signal when the vibration detecting signal is lower than the threshold value, and outputs a low-level signal when the vibration detecting signal is equal to or higher than the threshold value. The output signal of the comparator 42 is supplied to the microcomputer 26.

The microcomputer 26, to which the EEPROM 28 is connected, supplies threshold data to the D/A converter 44, which converts the threshold data into the corresponding analog signal applied to the comparator 42. The microcomputer 26 controls the switch 30 in accordance with the signal supplied from the comparator 42 so that the appropriate speed control signal can be applied to the spindle motor driver 32. There are provided the speed control signals respectively corresponding to the 2-times, 4-times and 16-times reproduction speeds of the optical disk 40. The spindle motor driver 32 rotates the spindle motor 34 in accordance with the speed control signal supplied thereto. Hence, the optical disk 40 is rotated at the instructed rotational speed.

FIG. 7 is a flowchart of a rotational speed control process executed by the microcomputer 26 shown in FIG. 6. The process shown in FIG. 5 is executed at the time of starting to drive the optical disk drive. At step S110, the microcomputer 26 controls the switch 30 so that the speed control signal is supplied to the spindle motor driver 32 that rotates the optical disk 40 at the given rotational speed S1.

At step S120, the microcomputer 26 gradually increases the threshold data to be supplied to the D/A converter 44 starting from the minimum value. Then, the microcomputer 26 detects threshold data at which the output signal of the comparator 42 is switched from the high level to the low level. Then, the microcomputer 26 reads vibration detecting data from the above threshold data, and determines, from the vibration detecting data G, to which one of the characteristics H1–H4 the optical disk 40 corresponds by using the map shown in FIG. 4.

At step S130, with regard to the optical disk of interest, the microcomputer 26 computes, by using the map shown in FIG. 4, the speed at which the vibration detecting data G becomes below the threshold value G1 of the vibration level.

At step S140, the microcomputer 26 controls the switch 30 so that the speed control signal corresponding to the calculated rotational speed is supplied to the spindle motor driver 32, and ends the process shown in FIG. 5.

As described above, it is possible to determine what rotational speed the optical disk 40 in progress of reproduction can be rotated at in the state in which vibration is less than the threshold value G1 by using the map shown in FIG. 4. Thus, the optical disk 40 can be rotated at the optimal or maximum rotational speed. Since the threshold value G1 as to the vibration level is registered in the EEPROM 28 at the time of production, the threshold value G1 can be set based on the users' demands. For example, if the user wishes to have low vibration and correct data readout rather than high-speed data readout, the threshold value G1 is set to a comparatively low level. If the user wishes to have high-speed data readout rather than low vibration, the threshold value G1 is set to a comparatively high level.

In FIGS. 5 and 7, the shock sensor 20 functions as vibration detecting means, and steps S30 and S130 respectively function as operation means. Further, steps S40 and S140 respectively function as control means.

The present invention is not limited to the specifically disclosed embodiments, and variations and modifications may be made without departing from the scope of the present invention.

What is claimed is:

1. An optical disk drive driving an optical disk, comprising:

vibration detecting means for detecting a vibration due to rotation of the optical disk;

operation means for calculating a rotational speed of the optical disk at which the vibration detected by the vibration detecting means is equal to or close to a given threshold value which is a critical point for tolerable vibration; and control means for controlling the optical disk to be rotated at the rotational speed calculated by the operation means.

2. The optical disk drive as claimed in claim 1, wherein 1, further comprising memory means for storing a map which describes a plurality of relationships between the rotational speed and the vibration level, wherein the operation means calculates the rotational speed by referring to the map stored in the memory means.

3. The optical disk drive as claimed in claim 2, wherein the operation means detects which one of the plurality of the relationships stored in the map corresponds to the optical disk by using the vibration detected by the vibration detecting means.

4. The optical disk drive as claimed in claim 2, wherein the operation means calculates the rotational speed which corresponds to the given threshold value related to said one of the plurality of relationships.

5. The optical disk drive as claimed in claim 1, wherein the given threshold value corresponds to a demand by a user.

6. The optical disk drive as claimed in claim 2, wherein the operation means detects which one of the plurality of the relationships stored in the map corresponds to the optical disk by referring to using the vibration detected by the vibration detecting means obtained when the optical disk is rotated at a given rotational speed.

7. The optical disk drive as claimed in claim 2, wherein the memory means is a non-volatile memory.

8. The optical disk drive as claimed in claim 2, wherein the operation means detects which one of the plurality of the relationships stored in the map corresponds to the optical disk by using the vibration detected by the vibration detecting means obtained when the rotational speed of the optical disk is gradually increased from a given minimum level.

* * * * *